(12) United States Patent
Yu

(10) Patent No.: US 6,968,767 B2
(45) Date of Patent: Nov. 29, 2005

(54) SAW MACHINE HAVING TWO SAW BLADES

(76) Inventor: Hsi Hui Yu, P.O. Box 63-99, Taichung (TW) 406

( * ) Notice: Subject to any disclaimer, the term of this patent is extended or adjusted under 35 U.S.C. 154(b) by 0 days.

(21) Appl. No.: 10/646,986

(22) Filed: Aug. 20, 2003

(65) Prior Publication Data

US 2005/0039591 A1    Feb. 24, 2005

(51) Int. Cl.[7] .............................................. B27B 5/24
(52) U.S. Cl. ..................... 83/473; 83/477.1; 83/491; 83/581
(58) Field of Search ............................ 83/477.1, 477.2, 83/491, 609, 508, 603, 781, 863, 473, 581, 83/508.2, 698.11

(56) References Cited

U.S. PATENT DOCUMENTS

| | | | | |
|---|---|---|---|---|
| 2,068,964 A | * | 1/1937 | Tautz ........................... | 83/473 |
| 2,661,777 A | * | 12/1953 | Hitchcock .................... | 83/473 |
| 2,913,025 A | | 11/1959 | Richards | |
| 3,011,529 A | * | 12/1961 | Copp ........................... | 83/473 |
| 5,159,869 A | * | 11/1992 | Tagliaferri ................... | 83/862 |
| 6,283,002 B1 | * | 9/2001 | Chiang ....................... | 83/477.1 |
| 6,530,303 B1 | * | 3/2003 | Parks et al. .................... | 83/473 |
| 6,546,835 B2 | * | 4/2003 | Wang ........................ | 83/477.1 |
| 6,722,242 B2 | * | 4/2004 | Chuang ...................... | 83/471.3 |

* cited by examiner

Primary Examiner—Allan N. Shoap
Assistant Examiner—Phong Nguyen
(74) Attorney, Agent, or Firm—Charles E. Baxley

(57) ABSTRACT

A saw machine includes a seat disposed in a housing, two frames rotatably secured to the seat with pivot pins and each having a sector gear and a saw blade, and a driving device for driving the saw blades. A shaft is rotatably secured to the seat and has a worm engaged with the sector gear of one of the frames, to rotate and adjust the frame relative to the seat. A conduit is rotatably engaged on the shaft and has a worm engaged with the sector gear of the other frame, to adjust the other frame relative to the seat. A support device includes a block having an orifice to rotatably receive the shaft and to stably support and retain the shaft to the seat.

13 Claims, 4 Drawing Sheets

SAW MACHINE HAVING TWO SAW BLADES

BACKGROUND OF THE INVENTION

1. Field of the Invention

The present invention relates to a saw machine, and more particularly to a saw machine having two or more saw blades driven by different driving motors.

2. Description of the Prior Art

Typical saw machines comprise a single saw blade for cutting work pieces. Normally, after the work pieces are cut by the saw blade, a coarse side edge will be formed on the work pieces and may hurt the workers and/or the users inadvertently.

In order to prevent the coarse side edges of the work pieces from hurting the workers or the users, the coarse side edges of the work pieces may have to be ground by the other sander or grinding machines.

Accordingly, for some of the other typical saw machines may provide an additional sander or grinding machine or tool member beside the saw blade, for allowing the workers to easily grind the coarse side edges of the work pieces with the additional sander or grinding machine or tool member.

For example, U.S. Pat. No. 2,913,025 to Richards discloses one of the typical saw machines having an additional sander or grinding machine or tool member provided and disposed beside the saw blade, for grinding purposes.

However, after the cutting operations by the saw blades, the work pieces should further be removed from the cutting or saw machine, and to be engaged with the sander or grinding machine or tool member for grinding purposes.

The present invention has arisen to mitigate and/or obviate the afore-described disadvantages of the conventional saw machines.

SUMMARY OF THE INVENTION

The primary objective of the present invention is to provide a saw machine including a primary saw blade for cutting operation, and a secondary or auxiliary saw blade for trimming the coarse side edges of the work pieces right after the cutting operation with the primary saw blade, and including a support device to support the driving axles of the primary saw blade and the secondary or auxiliary saw blade.

In accordance with one aspect of the invention, there is provided a saw machine comprising a housing, a seat disposed in the housing, a first frame and a second frame each rotatably secured to the seat with a pivot pin respectively, and each including a sector gear provided thereon, a first saw blade and a second saw blade attached to the first frame and the second frame respectively, means for driving the first saw blade and the second saw blade, a first adjusting means for adjusting the first frame relative to the seat, and a second adjusting means for adjusting the second frame relative to the seat.

The first adjusting means includes a shaft rotatably secured to the seat, and a worm disposed on the shaft and engaged with the sector gear of the first frame, to rotate and adjust the first frame relative to the seat with the shaft and the worm and the sector gear of the first frame. A support device is further provided to support the shaft on the seat, and includes a block having an orifice formed therein to rotatably receive the shaft and to stably support and retain the shaft to the seat.

A board may further be provided and secured to the seat, and the block is secured to the board. A bracket may further be provided and secured to the seat and the block is secured to the bracket. The bracket includes at least one oblong hole formed therein, and a fastener engaged through the oblong hole of the bracket and attached to the seat, to adjustably secure the bracket to the seat.

The bracket includes an arm having at least one oblong hole formed therein, and a fastener engaged through the oblong hole of the arm of the bracket and attached to the block, to adjustably secure the block to the bracket. A hand wheel may be secured to the shaft and to rotate the shaft relative to the seat.

The second adjusting means includes a conduit rotatably engaged on the shaft, a hand wheel secured to the conduit and to rotate the conduit relative to the seat. Two motors are coupled to the saw blades to drive the saw blades separately or respectively.

A rotating device may further be provided for rotating said seat relative to said housing, and includes a first and a second side plates secured to the seat and rotatably attached to the housing, the first side plate includes a sector gear, a rod rotatably secured to the seat, and a worm disposed on the rod and engaged with the sector gear of the first side plate, to rotate and adjust the first side plate relative to the seat with the rod and the worm and the sector gear of the first side plate. A hand wheel is secured to the rod and to rotate the rod relative to the seat.

A spring biasing device may further be provided for applying a biasing force between the seat and the first frame, and/or another spring biasing device may further be provided for applying a spring biasing force between the seat and the second frame.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
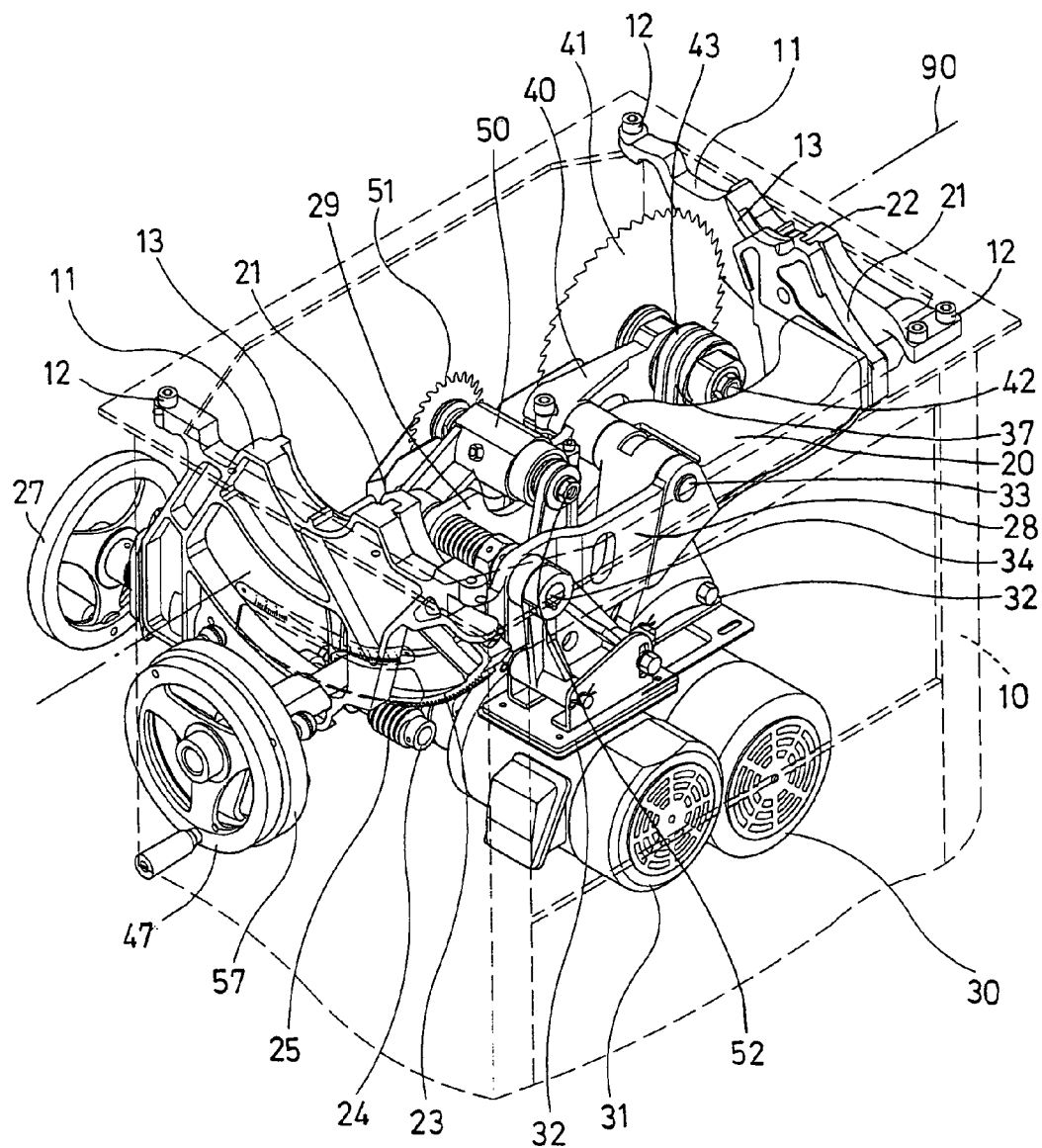
FIG. 1 is a partial perspective view of a saw machine in accordance with the present invention, in which the outer housing of the saw machine is shown in dotted lines to show the inner structure of the saw machine.
Figure 2:
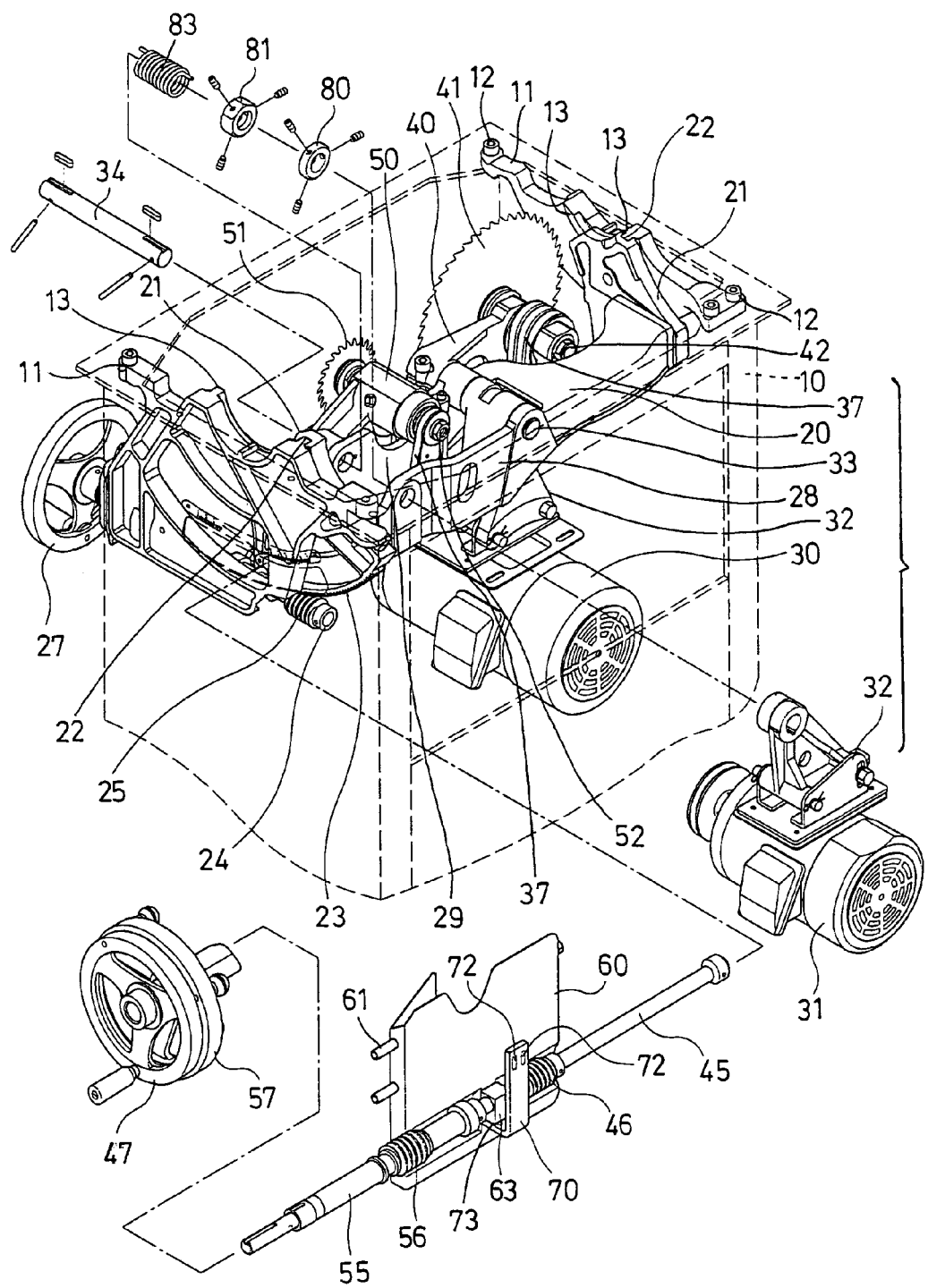
FIGS. 2, 3 are partial exploded views of the saw machine.

Referring to the drawings, and initially to FIGS. 1 and 2, a saw machine in accordance with the present invention comprises a housing 10 including two fences 11 secured to two sides of the housing 10 with such as fasteners 12 or by welding processes, or form integral with the housing 10. The housing 10 includes a semi-circular or curved track 13 provided on each of the sides or each of the fences 11 thereof.

As shown in FIGS. 1–4, a seat 20 is disposed in the housing 10 and located or arranged between the two sides or fences 11 of the housing 10, and includes two side plates 21 secured thereto. Each of the side plates 21 of the seat 20 includes a semi-circular or curved channel 22 formed therein to slidably receive the corresponding semi-circular or curved tracks 13 of the housing 10, and thus to pivotally or rotatably secure the seat 20 within the housing 10.

One of the side plates 21 of the seat 20 includes a gear segment or sector gear 23 formed or provided thereon. A rod 24 is rotatably secured or supported in the housing 10 and includes a gear or worm 25 disposed or provided thereon for engaging with the gear segment or sector gear 23 of the side plate 21 of the seat 20, and for rotating or adjusting the seat 20 relative to the housing 10. A hand wheel 27 is secured to the rod 24, to rotate or adjust the seat 20 relative to the housing 10 via the worm 25 and the sector gear 23.

Two motors 30, 31 are secured to the seat 20 with coupling members 32 and pivot pins 33, 34 respectively, such that the motors 30, 31 may also be rotated or adjusted relative to the housing 10 together with the seat 20. The pivot pins 33, 34 may be secured between two panels 28, 29 of the seat 20 (FIGS. 1–3), and are preferably arranged perpendicular to the longitudinal direction or axis 90 of the seat 20 (FIG. 1).

Two frames 40, 50 are rotatably secured to the housing 10 with the pivot pins 33, 34 respectively, and two saw blades 41, 51 are rotatably secured to the frames 40, 50 with pivot poles 42, 52 respectively. The pivot poles 42, 52 are coupled to the motors 30, 31 with such as a gear transmission (not shown), a belt-and pulley coupling. For example, each of the pivot poles 42, 52 includes a pulley 43 coupled to the pulleys 35 of the motors 30, 31 with a belt 37 respectively, for allowing the saw blades 41, 51 to be driven by the motors 30, 31 respectively.

Alternatively, the saw blades 41, 51 may also be coupled to either of the motors 30, 31, and driven by one of the motors 30, 31, instead of being driven by the motors 30, 31 separately.

Figure 4:
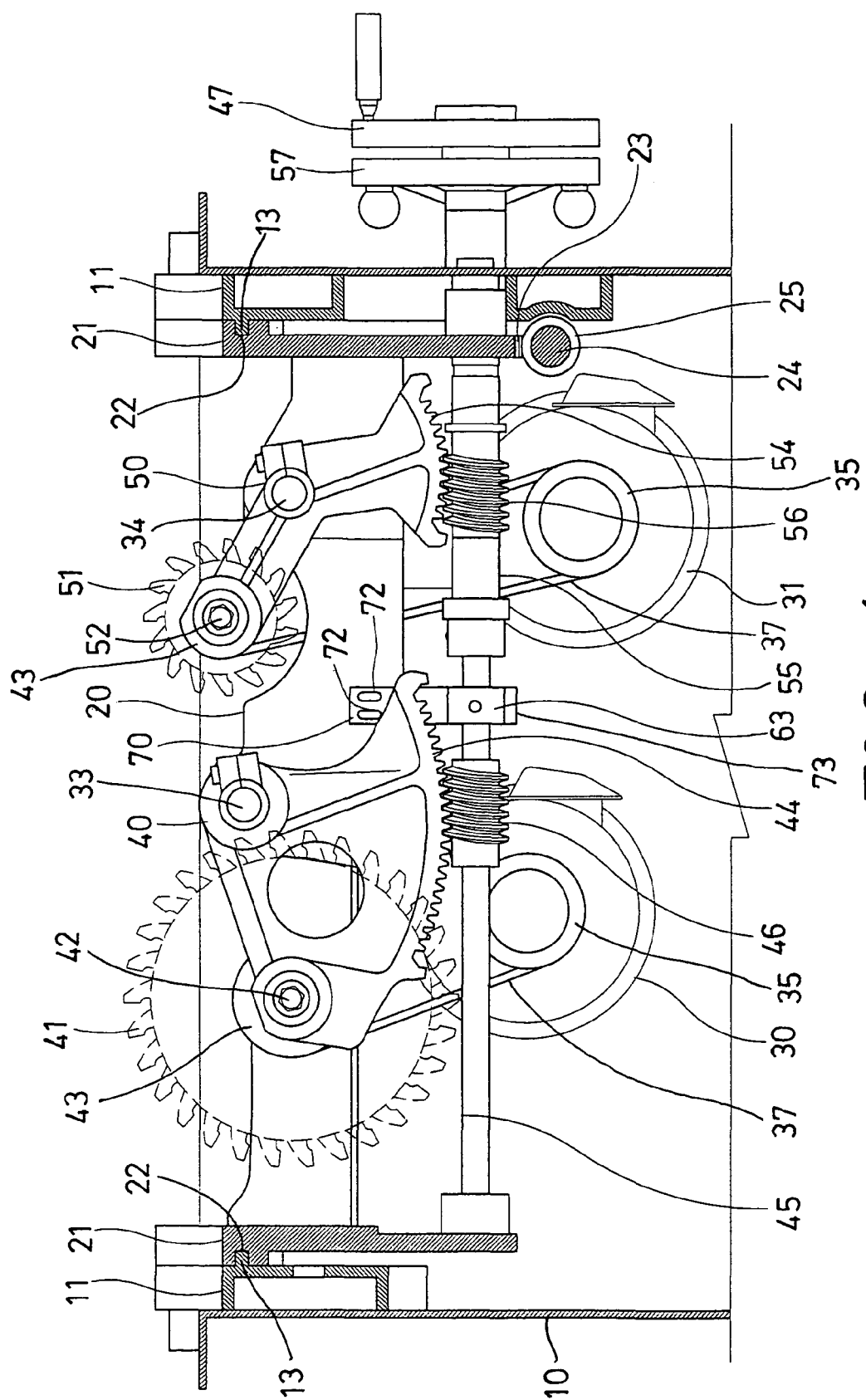
FIG. 4 is a partial plan schematic view of the saw machine, illustrating the operation of the saw machine.

As shown in FIG. 4, each of the frames 40, 50 includes a gear segment or sector gear 44, 54 formed or provided thereon. A shaft 45 is rotatably secured or supported in the seat 20, such as supported between the side plates 21 of the seat 20, and includes a gear or worm 46 disposed or provided thereon for engaging with the gear segment or sector gear 44 of the frame 40, and for rotating or adjusting the frame 40 relative to the seat 20. A hand wheel 47 is secured to the shaft 45, to rotate or adjust the frame 40 relative to the seat 20 via the worm 46 and the sector gear 44. The hand wheel 47 and/or the worm 46 and the sector gear 44 may thus be formed as an adjusting means or device to rotate or adjust the frame 40 and thus the saw blade 41 relative to the seat 20.

A conduit 55 is rotatably secured or supported in the seat 20, or rotatably engaged onto the shaft 45, and includes a gear or worm 46 disposed or provided thereon for engaging with the gear segment or sector gear 54 of the other frame 50, and for rotating or adjusting the frame 50 relative to the seat 20. A hand wheel 57 is secured to the conduit 55, to rotate or adjust the frame 50 relative to the seat 20 via the worm 56 and the sector gear 54. The hand wheel 57 and/or the worm 56 and the sector gear 54 may thus be formed as another adjusting means or device to rotate or adjust the frame 50 and thus the saw blade 51 relative to the seat 20.

A board 60 is secured to the seat 20, such as secured between the side plates 21 of the seat 20 with such as latches or fasteners 61. A block 63 is secured to the board 60 with such as fasteners 64 and includes an orifice 65 formed therein to rotatably receive the shaft 45, and thus to stably support and retain the shaft 45 to the seat 20. It is preferable that the block 63 is engaged onto the middle portion of the shaft 45, best shown in FIG. 4, in order to stably support and retain the shaft 45 to the seat 20, and to prevent the shaft 45 from being bent or distorted relative to the seat 20.

A bracket 70 may further be provided and secured to the seat 20, such as secured to one of the panels 28, 29 of the seat 20 with such as fasteners 71. The bracket 70 may include one or more oblong holes 72 formed therein to slidably receive the fasteners 71, for allowing the bracket 70 to be adjusted relative to the seat 20 and to be adjusted relative to the board 60.

The bracket 70 further includes an arm 73 laterally extended therefrom to engage with and to further stably support or retain the shaft 45 to the seat 20. The arm 73 of the bracket 70 includes one or more oblong holes 74 formed therein to slidably receive fasteners 75 respectively which may secure the block 63 to the arm 73 of the bracket 70, in order to further solidly secure the block 63 and thus the shaft 45 to the bracket 70, and thus to the seat 20. The board 60 and/or the bracket 70 may thus be formed as a supporting means or device to support the shaft 45 and/or the conduit 55 relative to the seat 20.

Figure 3:
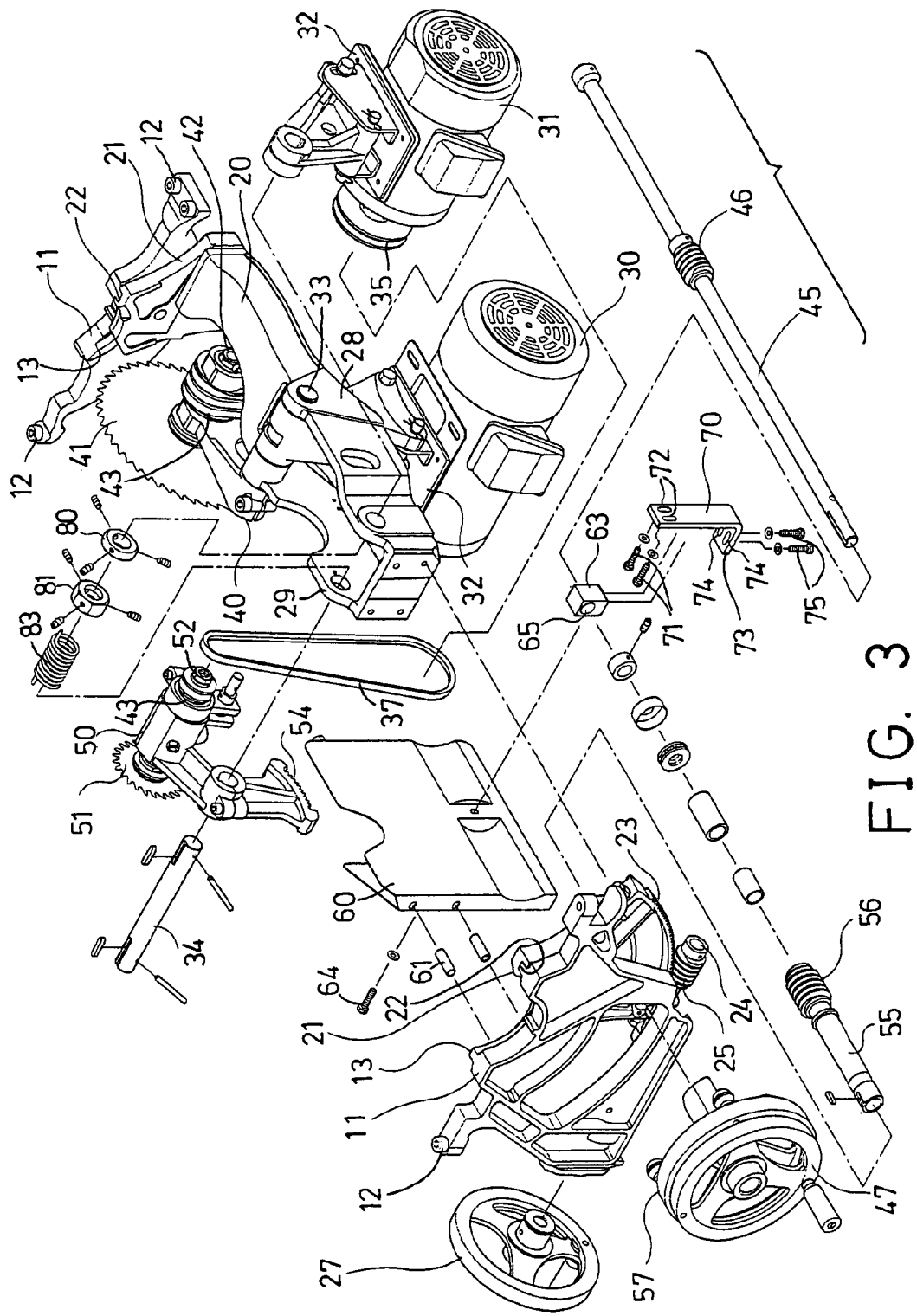

As shown in FIGS. 2 and 3, a stop 80 is secured onto each of the pivot pins 33, 34, and engaged or contacted with one of the panels 28, 29 of the seat 20, to limit the movement of the pivot pins 33, 34 relative to the seat 20, or to prevent the pivot pins 33, 34 from moving axially relative to the seat 20. Two further fasteners or lock nuts 81 are secured onto the pivot pins 33, 34, and two spring members 83 are engaged onto the pivot pins 33, 34, and engaged or secured between the seat 20 and the lock nuts 81 or the pivot pins 33, 34 respectively, to apply a spring biasing force or a recovering force against the pivot pins 33, 34 respectively.

It is to be noted that the primary saw blade 41 may be used for cutting work pieces, for example, and the secondary or auxiliary saw blade 51 may be used for trimming the coarse side edges of the work pieces right after the cutting operation with the primary saw blade 41. The shaft 45 and thus the conduit 55 may be solidly secured or supported to the seat 20 with the block 63 and the bracket 70 and/or the board 60.

Accordingly, the saw machine in accordance with the present invention includes a primary saw blade for cutting operation, and a secondary or auxiliary saw blade for trimming the coarse side edges of the work pieces right after the cutting operation with the primary saw blade, and includes a support device to support the driving axles of the primary saw blade and the secondary or auxiliary saw blade.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saw machine comprising:
   a housing,
   a seat disposed in said housing,
   a first frame and a second frame each rotatably secured to said seat with a pivot pin respectively, and each including a sector gear provided thereon,
   a first saw blade and a second saw blade attached to said first frame and said second frame respectively,
   means for driving said first saw blade and said second saw blade,
   a first adjusting means for adjusting said first frame relative to said seat, and said first adjusting means including a shaft rotatably secured to said seat, and a worm disposed on said shaft and engaged with said sector gear of said first frame, to rotate and adjust said first frame relative to said seat with said shaft and said worm and said sector gear of said first frame,
   a second adjusting means for adjusting said second frame relative to said seat, and means for supporting said shaft on said seat, said supporting means including a block having an orifice formed therein to rotatably receive said shaft and to stably support and retain said shaft to said seat, and including a bracket secured to said seat and said block is secured to said bracket, said bracket including at least one oblong hole formed therein, and a fastener engaged through said at least one oblong hole of said bracket and attached to said seat, to adjustably secure said bracket to said seat.

2. The saw machine as claimed in claim 1, wherein said supporting means includes a board secured to said seat, and said block is secured to said board.

3. The saw machine as claimed in claim 1, wherein said first adjusting means includes a hand wheel secured to said shaft and to rotate said shaft relative to said seat.

4. The saw machine as claimed in claim 1, wherein said second adjusting means includes a conduit rotatably engaged on said shaft.

5. The saw machine as claimed in claim 4, wherein said second adjusting means includes a hand wheel secured to said conduit and to rotate said conduit relative to said seat.

6. The saw machine as claimed in claim 4, wherein said driving means includes two motors coupled to said first saw blade and said second saw blade, to drive said first saw blade and said second saw blade respectively.

7. The saw machine as claimed in claim 1, wherein said second adjusting means includes a conduit rotatably secured to said seat, and a worm disposed on said conduit and engaged with said sector gear of said second frame, to rotate and adjust said second frame relative to said seat.

8. The saw machine as claimed in claim 1 further comprising means for rotating said seat relative to said housing.

9. The saw machine as claimed in claim 8, wherein said rotating means includes a first and a second side plates secured to said seat and rotatably attached to said housing, said first side plate includes a sector gear, a rod rotatably secured to said seat, and a worm disposed on said rod and engaged with said sector gear of said first side plate, to rotate and adjust said first side plate relative to said seat with said rod and said worm and said sector gear of said first side plate.

10. The saw machine as claimed in claim 9, wherein said rotating means includes a hand wheel secured to said rod and to rotate said rod relative to said seat.

11. The saw machine as claimed in claim 1 further comprising means for applying a biasing force between said seat and said first frame.

12. The saw machine as claimed in claim 1 further comprising means for applying a biasing force between said seat and said second frame.

13. A saw machine comprising:

a housing, a seat disposed in said housing, a first frame and a second frame each rotatably secured to said seat with a pivot pin respectively, and each including a sector gear provided thereon, a first saw blade and a second saw blade attached to said first frame and said second frame respectively, means for driving said first saw blade and said second saw blade, a first adjusting means for adjusting said first frame relative to said seat, and said first adjusting means including a shaft rotatably secured to said seat, and a worm disposed on said shaft and engaged with said sector gear of said first frame, to rotate and adjust said first frame relative to said seat with said shaft and said worm and said sector gear of said first frame, a second adjusting means for adjusting said second frame relative to said seat, and means for supporting said shaft on said seat, said supporting means including a block having an orifice formed therein to rotatably receive said shaft and to stably support and retain said shaft to said seat, and including a bracket secured to said seat and said block is secured to said bracket, said bracket including an arm having at least one oblong hole formed therein, and a fastener engaged through said at least one oblong hole of said arm of said bracket and attached to said block, to adjustably secure said block to said bracket.

* * * * *